S. NORDENBERG AND S. DONNER.
SUGAR BEET BLOCKER.
APPLICATION FILED JUNE 16, 1919.

1,346,332.

Patented July 13, 1920.
2 SHEETS—SHEET 2.

Inventor
Sigfred Nordenberg
and
Stephen Donner.
By Edgar M. Kitchin
His Attorney ure of the dignity of the United States.

UNITED STATES PATENT OFFICE.

SIGFRED NORDENBERG AND STEPHEN DONNER, OF JENNINGS, MICHIGAN.

SUGAR-BEET BLOCKER.

1,346,332.  Specification of Letters Patent.  Patented July 13, 1920.

Application filed June 16, 1919. Serial No. 304,392.

*To all whom it may concern:*

Be it known that we, SIGFRED NORDENBERG and STEPHEN DONNER, citizens of the United States, residing at Jennings, in the county of Missaukee and State of Michigan, have invented certain new and useful Improvements in Sugar-Beet Blockers; and we do hereby declare the following to be a full, clear, and exact description of the invention, such as will enable others skilled in the art to which it appertains to make and use the same.

The present invention relates to beet blockers, or machines for thinning out the beets of rows or similar vegetable plants where it is necessary to reduce the number of plants in the rows.

An object of the present invention is to provide a relatively light, simply-constructed machine having supporting wheels and a cutting arrangement adapted to be driven by one of the wheels for movement at predetermined intervals for cutting the beets or other vegetables in the row, the machine being adapted to be pushed over the rows or to be pulled if desired.

Another object of the present invention is to provide a mounting for a blade to hold it for horizontal reciprocating motion, and a novel connection between the blade and a wheel or other movable part of the machine for causing the blade to move with the desired regularity to cut out the plants at the desired interval in the row.

With these and further objects in view as will in part hereinafter become apparent and in part be stated, the invention comprises certain novel constructions, combinations and arrangements of parts as subsequently specified and claimed.

In the accompanying drawings,—

Figure 1:
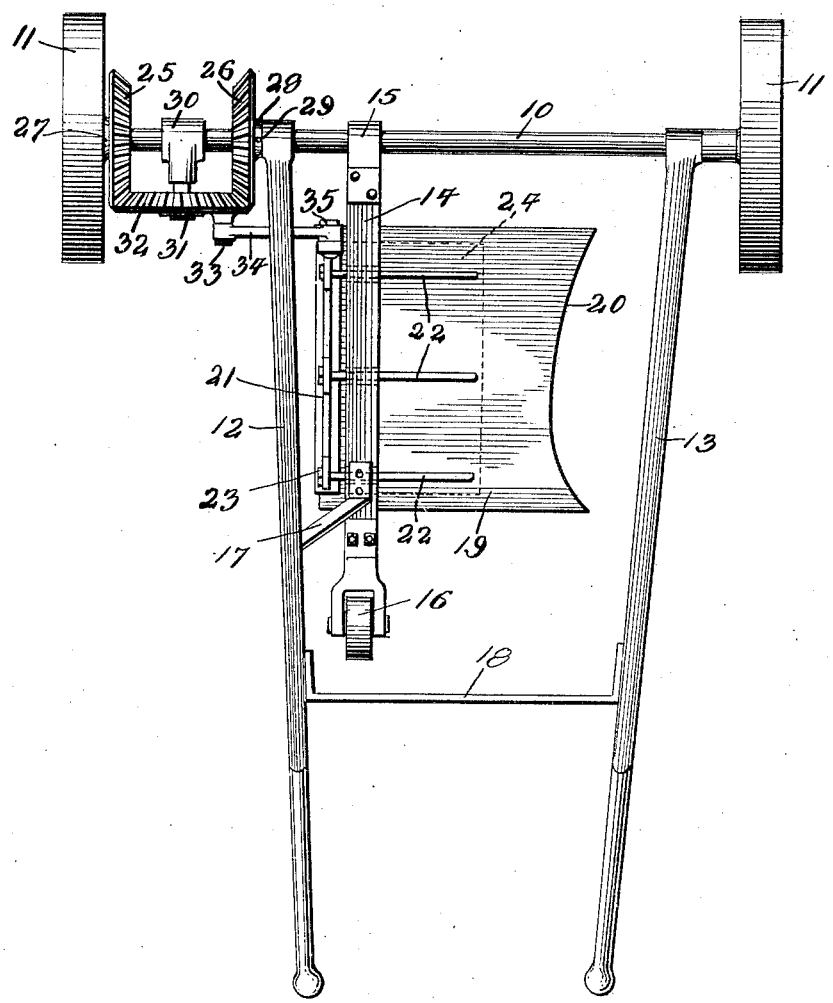
Figure 1 is a top plan view of a beet blocker constructed according to the present invention.
Figure 2:
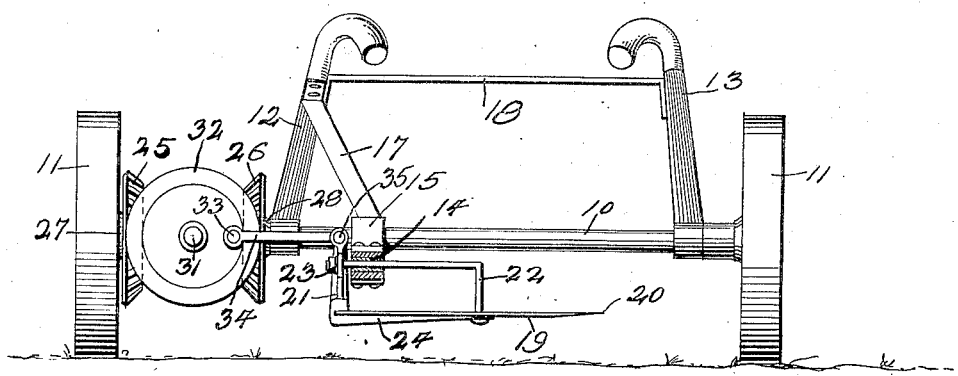
Fig. 2 is a rear elevation of the same.
Figure 3:
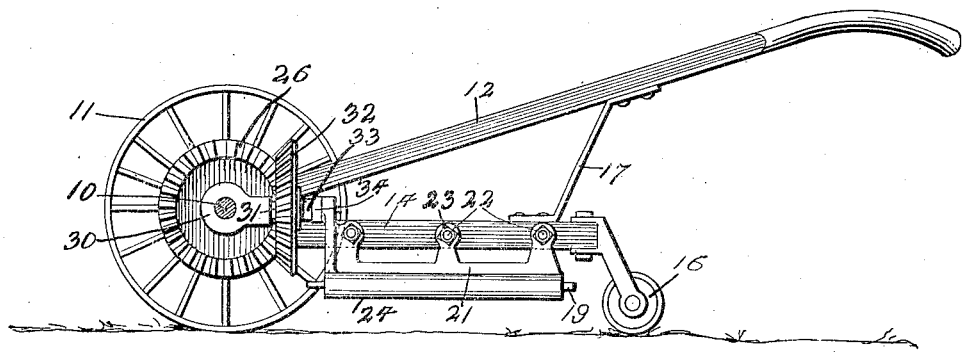
Fig. 3 is a side elevation of the beet blocker.

Referring to the drawings by numerals, 10 designates an axle upon which are mounted supporting wheels 11 adapted to travel at opposite sides of a row of plants to be thinned out or blocked. The axle 10 may be moved over two of the plants in any suitable manner, and, in the present instance, the machine is adapted to be pushed and is provided with a pair of rearwardly and upwardly extending handles 12 and 13 which are mounted at their forward ends on the axle and preferably converge slightly throughout their lengths to their rear ends.

The axle 10 carries a rearwardly extending beam 14 which may be connected to the axle by a drop hanger 15 to support the forward end of the beam 14 a short distance above the ground, the beam 14 carrying a roller or supporting wheel 16 upon its rear end for supporting the beam and spacing the major portion thereof at the desired and proper distance over the plants. The beam 14 may be braced upon the adjacent handle 12 by a brace bar 17 and a cross brace 18 may be employed for connecting the rear end portions of the handles 12 and 13. The handles and beam 14 together with the axle 10 constitute a relatively rigid frame-work or body portion for the machine.

Suspended from the beam 14 is a cutter blade 19, the same comprising a flat body part adapted to be supported in a horizontal position beneath the frame and having its cutting edge arranged substantially beneath the intermediate portion of the frame, and with the cutting edge concaved as shown at 20 in Fig. 1. The forward portion of the edge 20 is formed on a curve struck on a relatively large radius while the rear end portion of the edge 20 is formed on a curve struck from a relatively short radius. This is for the purpose of giving a quick cutting action at the rear end of the blade immediately prior to the passage of the blade 19 over the plant to be cut out of the row. The blade 19 is provided with an upstanding head 21 at its outer edge and which extends substantially at right angles to the plane of the blade 19. Supporting and guide rods 22 in any desired number, three being shown in the present instance, are carried by the blade and its head and engage the beam 14 for supporting the blade. The bails or guides 22 are in the form of rods having elongated horizontal portions which slidably fit in transverse ways or openings formed in the beam 14. The outer ends of the guides or rods 22 pass through the upper portion of the head 21 and are held therein by nuts 23 or the like. The inner ends of the rods 22 are turned downwardly and pass through the blade 19, and are preferably headed therebeneath for supporting the blade 19. A web or base portion 24 may extend from the head 21 beneath the blade 19 for reinforcing and supporting it, and which also may receive the lower ends of the rods 22 therethrough for forming a substantial connection between the rods and the blade structure.

The axle 10 is provided at one end, between the wheel 11 and the adjacent handle 12, with a pair of spaced-apart beveled gear wheels 25 and 26. The gear wheel 25 is fixed to the adjacent supporting wheel 11 by a hub portion 27 and is adapted to turn with the supporting wheel. The gear wheel 26 is loose upon a sleeve 28 which is fixed by a set screw 29 to the axle 10 and is adapted to be shifted longitudinally on the axle into various distances from the gear wheel 25. Fixed upon the axle 10 is a bracket 30 carrying a rearwardly extending stub shaft 31 upon which a beveled gear wheel 32 is mounted, the gear wheel 32 being arranged between the rear sides of the gear wheels 25 and 26 and intermeshing therewith. The gear wheel 25 constitutes a driving means for the gear wheel 32 and the gear wheel 26 constitutes a supporting means for the gear wheel 32. The gear wheel 32 is provided upon its rear exposed side with a wrist pin 33 to which one end of a pitman 34 is connected, the other end of the pitman having connection at 35 with the forward end of the knife head 21.

It is apparent that when the machine is either pushed or pulled over a row of plants, the supporting wheel 11 turns the beveled gear 25 which is connected thereto and the latter operates the rotating element 32 and reciprocates the pitman 34. The motion of the pitman is transmitted through the head 21 to the blade 19, and the latter is reciprocated in a horizontal plane beneath the frame of the machine. The spaced apart guide rods 22 firmly support the blade 19 in its horizontal position and admit the free reciprocation thereof, as the draw and thrust of the pitman 34 is substantially longitudinally of the guide rods. When the blade 19 is withdrawn or moved into position beneath the handle 12, the machine moves freely over the plants. However, the continued movement of the machine causes the blade 19 to be moved transversely of the row of plants and the concave form of the cutting edge 20 with its abrupt curvature at the rear end produces a shearing or sliding action against the plants to insure the quick cutting of the plants without dragging or tearing the same out of the ground. The roller 16 maintains the blade 19 at a uniform distance from the ground under the varying conditions met with during the travel of the machine. As the machine is moved over a row of plants with the wheels 11 straddling the row, the operator can raise and lower the handles 12 and 13 for optionally supporting the blade 19 at the desired height to meet the different requirements in the blocking out of the beets in the row. The roller or wheel 16 is disposed toward one side of the machine and is adapted normally to travel along the ground at such elevation as to properly dispose the blade 19 for cutting the beet out of the row at the desired depth to thus eliminate certain plants from the row, the blade operating mechanism being proportioned to take out the desired beets. The rotating elements 32 may be substituted by other elements differing in size which may be fitted between the gear wheels 25 and 26 for driving the blade at different speeds according to the character of the plants operated upon. The sleeve 28 of the beveled gear wheel 26 may be slid along the axle 10 and fixed thereto at the desired point for intermeshing with the element 32 irrespective of its diameter. The beveled gear wheel 26 constitutes a brace or support for the rotary element 32 at the side thereof opposite the side where the driving element or gear wheel 25 intermeshes with the element 32.

We claim:—

1. In a beet blocker, a frame, a blade, a plurality of guide rods fixed on the blade and slidably engaging the frame for supporting the blade, a supporting wheel for the frame, and a reciprocating connection between the wheel and the blade for sliding the latter during the travel of the machine.

2. In a beet blocker, the combination of a frame, including a rearwardly extending beam, a plurality of guide rods slidably and transversely mounted in the beam, a horizontal blade mounted on the guide rods, a supporting wheel for the frame and a reciprocating connection between the supporting wheel and the blade for reciprocating the latter transversely upon the rods and beneath the frame.

3. In a beet blocker, the combination of a frame having a horizontal portion, guide rods slidably mounted upon said horizontal portion for movement transversely of the frame, a horizontal blade suspended on the guide rods, gear wheels carried by the frame, a supporting wheel for the frame connected to one of the gear wheels for driving the latter when the machine is moved over a row of plants, and a pitman connected between one of the gear wheels and the blade for reciprocating the latter on the guide rods.

4. In a beet blocker, a frame, a horizontally-disposed guide carried by the frame, a blade mounted in the guide to move in a horizontal plane, and operating means for reciprocating the blade, said blade having a forward cutting edge, the portion thereof at the front end of the blade being formed on a curve of a relatively large radius and having the portion of the cutting edge at the rear end of the blade formed on a curve of a relatively short radius and merging into the curve of the large radius, whereby quick cutting action is provided during the movement of the blade.

In testimony whereof we affix our signatures in presence of two witnesses.

SIGFRED NORDENBERG.
STEPHEN DONNER.

Witnesses:
OTTO C. THOMPSON,
ROBERT McCOY.